United States Patent
Sommer et al.

(10) Patent No.: US 6,853,471 B2
(45) Date of Patent: Feb. 8, 2005

(54) PHOTOCHROMIC SYNTHETIC RESIN OBJECT WITH PERMANENTLY INCREASED CONTRAST

(75) Inventors: Hans-Peter Sommer, Munich (DE); Michael Voegt, Gilching (DE); Gerd-Peter Scherg, Baldham (DE); Manfred Melzig, Wessling (DE)

(73) Assignee: Rodenstock GmbH, Munich (DE)

( * ) Notice: Subject to any disclaimer, the term of this patent is extended or adjusted under 35 U.S.C. 154(b) by 169 days.

(21) Appl. No.: 10/058,971

(22) Filed: Jan. 30, 2002

(65) Prior Publication Data

US 2002/0118431 A1 Aug. 29, 2002

Related U.S. Application Data

(63) Continuation of application No. PCT/EP01/06158, filed on May 20, 2001.

(30) Foreign Application Priority Data

May 30, 2000 (DE) .......................................... 100 26 717

(51) Int. Cl.$^7$ .............................. G02F 1/01; G02F 1/03; G02B 5/23
(52) U.S. Cl. ....................... 359/241; 359/238; 359/240; 252/586
(58) Field of Search ................................. 359/238, 241, 359/240, 243, 321; 252/586

(56) References Cited

U.S. PATENT DOCUMENTS 4,043,637 A * 8/1977 Hovey ......................... 359/241

6,416,307 B1 * 7/2002 Buazza et al. .............. 425/143

FOREIGN PATENT DOCUMENTS

| DE | 301084 | 9/1950 |
| DE | 3534276 | 4/1987 |
| DE | 4422663 | 1/1995 |
| EP | 0355672 | 2/1990 |
| EP | 06324293 | 11/1994 |
| WO | 88/02871 | 4/1988 |
| WO | 96/18928 | 6/1996 |
| WO | 00/05602 | 2/2000 |
| WO | 00/18569 | 4/2000 |
| WO | 00/29877 | 5/2000 |

OTHER PUBLICATIONS

T.R. Pampalone and F.A. Kuyan, Contrast Enhancing Additives for Positive Photoresist, Journal of the Electrochemical Society 135 Feb. (1988), No. 2.

German Office Action.

* cited by examiner

Primary Examiner—Georgia Epps
Assistant Examiner—Timothy Thompson
(74) Attorney, Agent, or Firm—Crowell & Moring LLP

(57) ABSTRACT

A photochromic synthetic resin (i.e., plastic) object characterized by a permanently increased contrast relative to the contrast of prior art photochromic synthetic resin objects, such that the photochromic synthetic resin object according to the invention exhibits improved contrast in the stationary states and in every intervening phase, including both darkening and lightening. The photochromic synthetic resin objects of the invention are particularly useful as lenses for eyeglasses, especially for sports glasses.

6 Claims, 3 Drawing Sheets

# PHOTOCHROMIC SYNTHETIC RESIN OBJECT WITH PERMANENTLY INCREASED CONTRAST

CROSS REFERENCE TO RELATED APPLICATIONS

This application is a continuation of international patent application no. PCT/EP01/06158, filed May 20, 2001, designating the United States of America, the entire disclosure of which is incorporated herein by reference. Priority is claimed based on Federal Republic of Germany patent application no. DE 100 26 717.3, filed May 30, 2000.

BACKGROUND OF THE INVENTION

The present invention relates to a photochromic synthetic resin (i.e., plastic) object, characterized by a permanently increased contrast relative to that of photochromic synthetic resin objects available in the prior art. That is, the photochromic synthetic resin object according to the invention displays an improved contrast in the stationary state and in every phase, both during darkening as well as during bleaching or lightening. The inventive synthetic resin object can be used as a photochromic lens for eyeglasses, particularly for sports glasses.

Photochromic synthetic resin objects, in particular eyeglass lenses, have been commercially available since the 1980's. The first lens to find widespread distribution, for example Rodenstock Perfalit ColorMatic (since 1986) or the colored lens from Transitions Optical, Inc. (since 1990) marketed by several lens manufacturers as the Transitions lens, contained spirooxazines as photochromic dyes which darkened in a blue tint. Later products, such as the Transitions Plus gray lens (since 1992), the Transitions Eurobraun and Hoya Sunbrown brown lenses (since 1994), and the new Rodenstock Perfalit ColorMatic lens (since 1995) contained pyrans in addition to spirooxazines and/or fulgides. Products currently on the market, such as the Transitions III lens, preferentially use pyrans, especially naphthopyrans, and larger ring systems derived therefrom. The Transitions III products having a refractive index of 1.56 are based on U.S. Pat. No. 5,753,146.

The lenses currently available according to the prior art all have the common feature that said lenses do not exhibit satisfactory contrast as a result of illumination-dependent darkening.

SUMMARY OF THE INVENTION

It is an object of the present invention to provide a photochromic synthetic resin (i.e., plastic) object characterized by a permanently increased contrast.

Another object of the invention is to provide a photochromic synthetic resin object which exhibits improved or increased contrast in the stationary state and in every intervening phase, both during darkening as well as during lightening.

A further object of the invention is to provide a photochromic synthetic resin object which is particularly suitable for use as a lens for eyeglasses, especially for sport glasses.

These and other objects are achieved in accordance with the present invention by providing a photochromic synthetic resin object comprising a transparent synthetic resin material and at least one photochromic dye incorporated therein, wherein said photochromic synthetic resin object further comprises at least one contrast increasing agent which absorbs light in the visible wavelength range from 380 nm to 500 nm such that when the at least one photochromic dye is in a lightened state, the photochromic synthetic resin object exhibits an average transmission of from 5% to 30% in the visible wavelength range from 380 nm to 500 nm.

In particular, a photochromic synthetic resin object is provided that comprises a transparent synthetic resin material and at least one photochromic dye incorporated therein, with the photochromic synthetic resin object additionally having at least one agent that increases the contrast (contrast-increasing agent) and that absorbs in the visible light region of 380 nm to 500 mm in such a way that in the lightened state of at least one photochromic dye, the photochromic synthetic resin object has an average transmission of at least 5%, up to a maximum of 30%, in the visible light region of 380 nm to 500 nm. In other words, in the lightened state of at least one photochromic dye, the photochromic synthetic resin object according to the invention shows at least a 70% reduction in the average transmission in the visible light wavelength range of from 380 nm to 500 nm.

In the lightened state of at least one photochromic dye, the photochromic synthetic resin object preferably has an average transmission of at most 20%, especially preferably 10% maximum, in the visible light region of 380 nm to 500 nm.

The photochromic synthetic resin object according to the invention is characterized by a permanently improved or increased contrast, such that an improved contrast is created in the stationary state as well as during the darkening phase and during the lightening phase, which are brought about by the photochromic dye. This can be based in particular on the corresponding absorption of the contrast-increasing agent in the visible light region of 380 nm to 500 nm, whereby the shortwave blue portion of the incoming light is substantially filtered out.

Due to the fact that the contrast between two objects is defined by the ratio of the difference between two luminances $L_I$ and $L_{II}$ to the sum thereof, and the luminance of blue scattered light is negligible, an increase in contrast cannot actually be objectively measured. However, a subjective impression is understood to be an increase in contrast within the scope of the present invention, as described in DOZ (Deutsche Optikerzeitung [German Opticians Journal]), 12/90, pp. 43 ff.

The shortwave blue portion of the incoming light is not entirely filtered out in the photochromic synthetic resin object according to the invention, since otherwise an undesired color distortion, that is, a distortion of the color fidelity, would be created. Therefore, in the lightened state of at least one photochromic dye the photochromic synthetic resin object has an average transmission of at least 5% in the visible light region of 380 nm to 500 nm. A low-level light in this spectral region is necessary to achieve high color fidelity.

BRIEF DESCRIPTION OF THE DRAWINGS

The invention will be described in further detail hereinafter with reference to tests of illustrative embodiments, the results of which tests are depicted graphically in the accompanying drawings in which.

DETAILED DESCRIPTION

Figure 1:
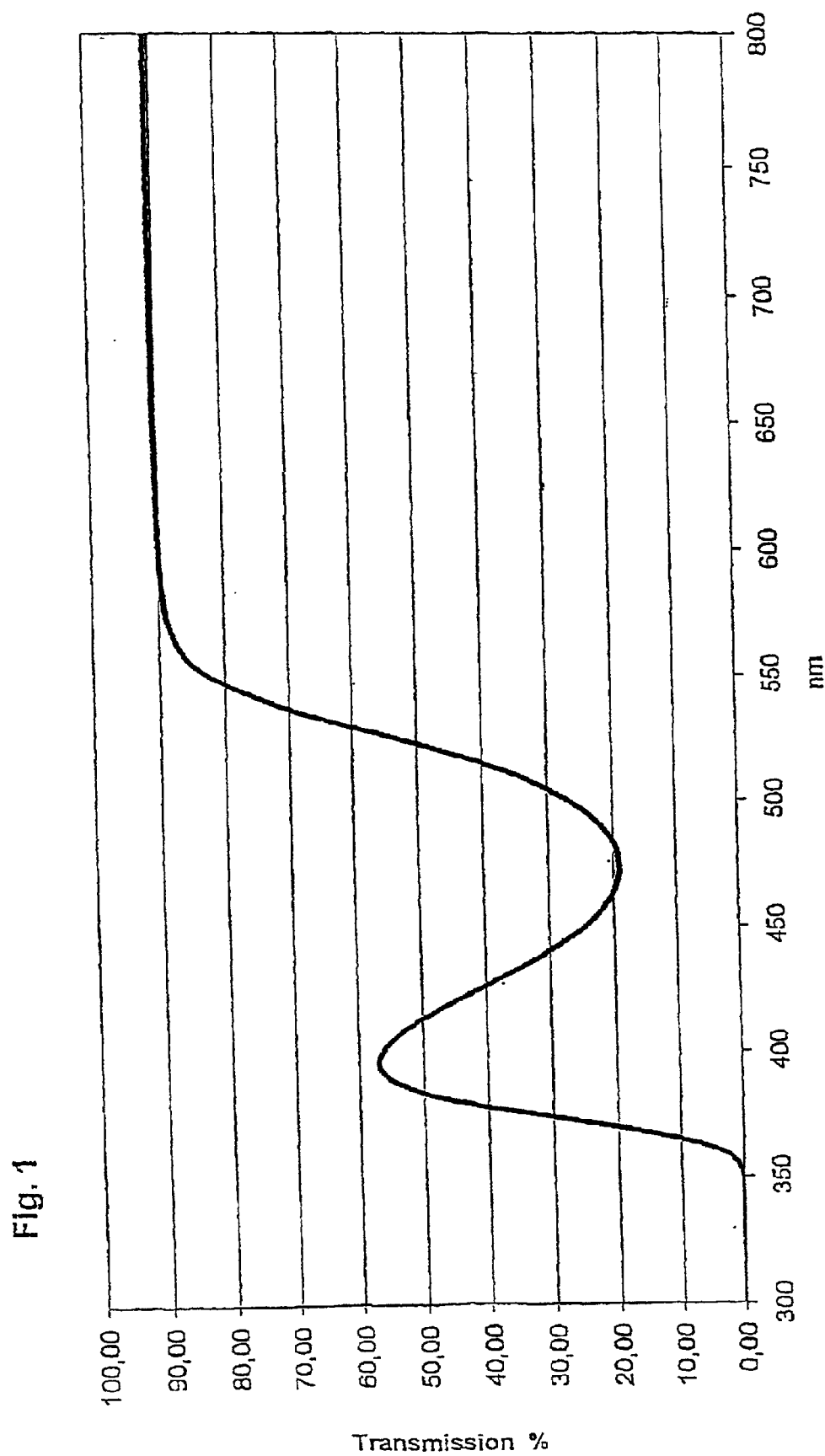
FIG. 1 shows the transmission curve for Celliton Orange R dye, marketed by BASF, in CR-39 synthetic resin (commercial name: diethylene glycol bis(allyl carbonate), marketed by PPG Industries).

The photochromic synthetic resin object according to the invention is especially suitable for use as a photochromic lens for eyeglasses, for example sports glasses such as ski glasses. Of course, the photochromic synthetic resin object according to the invention may also be used for all types of eyeglass lenses such as driving glasses and safety glasses, or for safety helmet visors, protective screens, windows, coverings, roofs, and the like.

The photochromic synthetic resin object according to the invention contains one or more synthetic resin materials as transparent synthetic resin materials that act as a substrate or matrix for the photochromic dye(s) to be used. The synthetic resin materials which are employed may be any of the synthetic resins commonly used in the state of the art, particularly for ophthalmological purposes. For example, the synthetic resin material may be chosen from poly ($C_1$–$C_{12}$ alkyl)methacrylates, polyoxyalkylene methacrylates, polyalkoxyphenolmethacrylates, cellulose acetate, cellulose triacetate, cellulose acetate propionate, cellulose acetate butyrate, polyvinyl acetate, polyvinyl alcohol, polyvinyl chloride, polyvinylidene chloride, polycarbonates, polyesters, polyurethanes, polyethylene terephthalate, polystyrene, poly-[]-methylstyrene, polyvinyl butyral, copoly(styrene-methylmethacrylate), copoly (styrene-acrylonitrile), and polymers composed of components of the group comprising polyol(allyl carbonate) monomers, polyfunctional acrylate, methacrylate, or diethylene glycol dimethacrylate monomers, ethoxylated bis-phenol-A-dimethacrylate monomers, diisopropenylbenzene monomers, ethylene glycol bis-methacrylate monomers, poly(ethylene glycol)bis-methacrylate monomers, ethoxylated phenolmethacrylate monomers, alkoxylated polyalcohol acrylate monomers, and diallylidene pentaerythritol monomers, or mixtures thereof.

In particular, the synthetic resin material can be a solid, transparent homo- or copolymer selected from the group consisting of poly(methylmethacrylate), poly(ethylene glycol bis-methacrylate), poly(ethoxylated bis-phenol-A-dimethacrylate), thermoplastic polycarbonate, polyvinyl acetate, polyvinyl butyral, polyurethane, or a polymer composed of monomers selected from the group consisting of diethylene glycol bis(allyl carbonate) monomers, diethylene glycol dimethacrylate monomers, ethoxylated phenolmethacrylate monomers, ethoxylated diisopropenylbenzene monomers, and ethoxylated trimethylolpropanetriacrylate monomers.

The photochromic compounds used for the present invention are not subject to any specific restrictions. The photochromic compounds are preferably chosen from the class of benzopyrans and higher annelated ring systems derived therefrom, especially naphthopyrans or fluorenopyrans.

Thus, for example, [2H]-naphtho(1,2-b)pyrans aromatically or heteroaromatically substituted in the 2,2 position and also [3H]-naphtho(2,1-b)pyrans correspondingly substituted in the 3,3 position, such as naphthopyrans described in international patent application no. PCT/DE98102820, and indeno[2,1-f]naphtho[1,2-b]pyran derivatives and/or spiro-9-fluoreno[1,2-b]pyran derivatives described in international patent application no. PCT/EP99/05258, may be used. Examples of suitable photochromic compounds include:

3,13-diphenyl-3-(4-diphenylaminophenyl)-13-hydroxy-6-methoxyindeno[2,1-f]naphtho[1,2-b]pyran, 13-(2,5-dimethylphenyl)-3-(4-diphenylaminophenyl)-13-hydroxy-6-methoxy-3-phenylindeno[2,1-f]-naphtho[1,2-b]pyran, 13-(2,5-dimethylphenyl)-3-(4-diphenylaminophenyl)-13-hydroxy-3-phenylindeno[2,1-f]naphtho[1,2-b]pyran, Spiro-9-fluoreno-13'-{3-(4-dimethylaminophenyl)-6-methoxy-3-phenylindeno[2,1-f]naphtho[1,2-b]pyran}, Spiro-9-fluoreno-13'-{3-(4-dimethylaminophenyl)-3-phenylindeno[2,1-f]naphtho-[1,2-b]pyran}, Spiro-9-fluoreno-13'-{3-(4-diphenylaminophenyl)-6-methoxy-3-phenylindeno[2,1-f]naphtho[1,2-b]pyran}, Spiro-9-fluoreno-13'-{3-(4-diphenylaminophenyl)-3-phenylindeno[2,1-f]naphtho-[1,2-b]pyran}, Spiro-9-fluoreno-13'-{3-[4-(N-morpholinyl)phenyl]-6-methoxy-3-phenylindeno[2,1-f]naphtho[1,2-b]pyran}, Spiro-9-fluoreno-13'-{3-[4-(N-morpholinyl)phenyl]3-phenylindeno[2,1-f]naphtho [1,2-b]pyran}, Spiro-9-fluoreno-13'-{6-methoxy-3-phenyl-3-[4-(N-piperidinyl)phenyl]indeno[2,1-f]naphtho[1,2-b]pyran}, and Spiro-9-fluoreno-13'-{3-phenyl-3-[4-(N-piperidinyl) phenyl]indeno[2,1-f]naphtho-[1,2-b]pyran}, as well as, for example, 3-(4-diphenylaminophenyl)-3-(2-fluorophenyl)-3H-naphtho [2,1-b]pyran, 3-(4-dimethylaminophenyl)-3-(2-fluorophenyl)-3H-naphtho [2,1-b]pyran, 3-(2-fluorophenyl)-3-[4-(N-morpholinyl)phenyl]-3H-naphtho[2,1-b]pyran, 3-(2-fluorophenyl)-3-[4-(N-piperidinyl)phenyl]-3H-naphtho[2,1-b]pyran, 3-(4-dimethylaminophenyl)-6-(N-morpholinyl)-3-phenyl-3H-naphtho[2,1-b]pyran, 6-(N-morpholinyl)-3-[4-(N-morpholinyl)phenyl]-3-phenyl-3H-naphtho[2,1-b]pyran, 6-(N-morpholinyl)-3-phenyl-3-[4-(N-piperidinyl)phenyl]-3H-naphtho [2,1-b]pyran, 6-(N-morpholinyl)-3-phenyl-3-[4-(N-pyrrolidinyl)phenyl]-3H-naphtho [2,1-b]pyran, 3-phenyl-3-(2-fluorophenyl)-3H-naphtho[2,1-b]pyran, 6-(N-morpholinyl)-3,3-diphenyl-3H-naphtho[2,1-b]pyran, and 6-(N-morpholinyl)-3-(4-methoxyphenyl)-3-phenyl-3H-naphtho[2,1-b]pyran.

However, the pyrans described in U.S. Pat. No. 5,753,146 and published European Patent Application No. EP 562,915, in addition to photochromic dyes of other classes such as oxazines, as described for example in U.S. Pat. No. 5,753, 146, or fulgides may also be used.

In a preferred embodiment of the present invention, the contrast-increasing agent may be a coloring agent selected from the group consisting of pigments and organic dyes, or the contrast-increasing agent may be designed as a reflective coating or an absorbent coating, or may be a combination of two or more thereof.

When an organic dye is provided as a contrast-increasing agent in one embodiment, the dye may be selected from the group consisting of azo dyes, polymethyne dyes, arylmethyne dyes, polyene dyes, and carbonyl dyes. Examples of organic dyes that may be used as contrast-increasing agents within the scope of the present invention, and which correspondingly absorb in the visible light region of 380 nm to 500 nm, include Celliton Orange R and Celliton Yellow 7GFL marketed by BASF, Resolin Brilliant Yellow PGG marketed by Bayer, Samaron Brilliant Orange GSL marketed by Dystar (formerly Hoechst), Terasil Orange R marketed by Ciba-Geigy, and Dorospers Orange R marketed by Dohmen.

FIG. 1 shows an example of the transmission curve for Celliton Orange R dye in CR-39 synthetic resin (commercial name: diethylene glycol bis(allyl carbonate), marketed by PPG Industries).

When in another embodiment a pigment is provided as a contrast-increasing agent, the pigment may be an inorganic or organic pigment.

In a further embodiment, the contrast-increasing agent may be provided as a reflective coating on the transparent synthetic resin material, which incorporates at least one photochromic dye. According to the present invention, this reflective coating is subject to no restrictions regarding the material used, as long as said reflective coating is designed such that the photochromic synthetic resin object in the lightened state of at least one photochromic dye has an average transmission of at most 30% in the visible light region of 380 nm to 500 nm. Such a reflective coating is preferably designed as a multilayer structure in which metal oxides such as $SiO_2$, $ZrO_2$, $TiO_2$, $Al_2O_3$, $HfO_2$ and $Ta_2O_5$, or metal fluorides such as $MgF_2$, may be used as materials. For example, such a reflective coating may be formed from seven alternating, higher low-refractive layers (7 $\lambda/4$ layers) of $TiO_2$ or $SiO_2$ and a $\lambda/2$ protective layer of $SiO_2$, where for example the thickness of the $\lambda/4$ $TiO_2$ layer is 48 nm, the $\lambda/4$ $SiO_2$ layer thickness is 74 nm, and the thickness of the $\lambda/2$ $SiO_2$ protective layer is 148 nm, where $\lambda$ stands for light having a wavelength of 440 nm. Such a reflective coating with a multilayer design may be created, for example, by known physical vapor deposition (PVD) methods.

In a further embodiment, the contrast-increasing agent may be provided as an absorbent coating on the transparent synthetic resin material, which incorporates at least one photochromic dye. According to the present invention, this absorbent coating is subject to no restrictions regarding the material used, as long as the absorbent coating absorbs in the visible light region of 380 nm to 500 nm such that the photochromic synthetic resin object in the lightened state of at least one photochromic dye has an average transmission of at most 30% the visible light region of 380 nm to 500 nm. Such an absorbent coating may have a multilayer design in the sequence $TiO_2/SiO_2/TiO_2/SiO_2/\ldots$, having one or more metal layers such as Cr, Ag, or Cu layers instead of a corresponding $TiO_2$ or $SiO_2$ layer, or the absorbent coating may be formed as a single layer from a dielectric matrix, such as $SiO_2$, having one or more coloring agents such as the pigments Mo, WO, or $FeO_x$, for example, or one or more organic dyes incorporated therein.

The photochromic synthetic resin object according to the invention may also have one or more hardcoat layers for improved scratch resistance. Furthermore, one or more conventional anti-reflective coatings may be provided on the side of the synthetic resin object facing toward the light.

The photochromic synthetic resin object according to the invention may be produced by various methods. In principle, photochromic synthetic resin lenses may be produced in three different ways. In a first way, the photochromic dyes may be homogeneously distributed in the body of the synthetic resin lens. Alternatively, in a second way, the photochromic dyes may be incorporated in the surface (generally only on the convex side) of the synthetic resin lens by diffusion, using heat. In the third way, the photochromic dyes may also be applied in a layer on the synthetic resin lens.

When the contrast-increasing agent is provided in the form of an organic dye, one or more organic dyes that are suitable for filtering out the shortwave blue portion of the incoming light to increase the contrast may be added to the synthetic resin materials—for example, during production of the synthetic resin object—in addition to at least one photochromic dye. Such mass coloration encompasses, for example, the dissolution or dispersion of at least one appropriate photochromic compound and at least one organic dye in a synthetic resin material, such as by addition of the compounds to a monomer feedstock before polymerization is carried out. In the case of mass coloration, that is, addition of the photochromic dyes and the organic, contrast-increasing dye before the polymerization, the photochromic and organic dyes may be added to the finished casting resin (monomers, initiator, any additives such as antioxidants, and UV absorber), preferably in a concentration of 0.01 to 0.1 wt %, preferably 0.03 to 0.06 wt %, for example, and preferably in proportions of photochromic dye(s)/organic dyes(s) equal to 1 to 10 wt %, relative to the weight of the photochromic dye.

On the other hand, at least one organic dye together with at least one photochromic dye may be incorporated into the synthetic resin material by diffusion in a dye bath. However, a decrease in photochromism sometimes occurs with this method. This can be avoided by diffusing the appropriate photochromic compound after the contrast-increasing agent, which is in the form of the organic dye. In addition to the dye concentration, the key factors in the production of diffusion-dyed lenses are the specialized synthetic resin matrix used, the diffusion rate, and the depth of penetration of the dyes. The dyeing time, dyeing temperature, and polymerization conditions of the synthetic resin lens also are important. When the permeation of synthetic resin material(s) along with the photochromic compound(s) and the contrast-increasing agent in the form of an organic dye is carried out by immersing the synthetic resin material in a hot solution of the photochromric dye(s) and the contrast-increasing agent, or by a thermal transfer method, for example, the corresponding organic dye used must have an "absorption hole," that is, the site where absorption is lowest, in the region where the photochromic dye simultaneously used has an absorption maximum. The term "permeation" refers to the migration of the photochromic compound(s) and at least one organic dye used as the contrast-increasing agent into the synthetic resin material, for example by the solvent-mediated transfer of the photochromic compound(s) into a polymer matrix, by vapor phase transfer, or other such surface diffusion methods.

When a pigment is provided as the contrast-increasing agent, and said pigment filters out the shortwave blue portion of the incoming light to increase the contrast, the pigment may be applied as a separate lacquer layer on the synthetic resin object according to the invention, specifically, on the side of the synthetic resin object facing away from the light so as not to impair darkening and lightening of the photochromic object.

Alternatively, application of the photochromic compound(s), and thus the photochromic effect, may also be achieved in the form of a separate lacquer layer on the synthetic resin material already provided with an organic dye as the contrast-increasing agent. Of course, the contrast-increasing agent in the form of an organic dye or pigment may also be applied in an additional lacquer layer on the side of the synthetic resin object facing away from the photochromic lacquer layer. This also applies to the contrast-increasing agent in the form of an absorbent coating. When the photochromic compound(s) is/are applied as part of a coating on the surface of the synthetic resin material, the concentration depends on the thickness of the coating. For example, for a coating thickness of 20 µm, 2 wt % has been found to be suitable, and for a coating thickness of 40 µm, 1 wt % is suitable.

When the contrast-increasing agent is provided in the form of a reflective coating or an absorbent coating, this coating is usually subsequently applied to the synthetic resin material containing at least one photochromic dye, whereby a bonding layer such as an SiO or Cr layer may optionally be provided in a thickness that does not impair the optical properties of the synthetic resin object according to the invention.

The present invention is explained in more detail in the following example.

EXAMPLE

A Perfalit ColorMatic Extra Grey synthetic resin lens from Rodenstock was used as the transparent photochromic synthetic resin material. A permanent dye, namely Dorospers Orange R dye from Dohmen, was used as the contrast-increasing agent according to the invention. The lens was covered on the convex side so that no diffusion could occur from that side. The lens was then placed in a dye bath containing the aforementioned dye in deionized water, using BS dispersant from Dohmen (concentration: 10 g Dorospers Orange R dye and 40 ml BS dispersant in 5 liters deionized water; temperature approximately 90° C.; dyeing time approximately 5 minutes). The covering was subsequently removed and the lens was cleaned by customary means.

Figure 2:
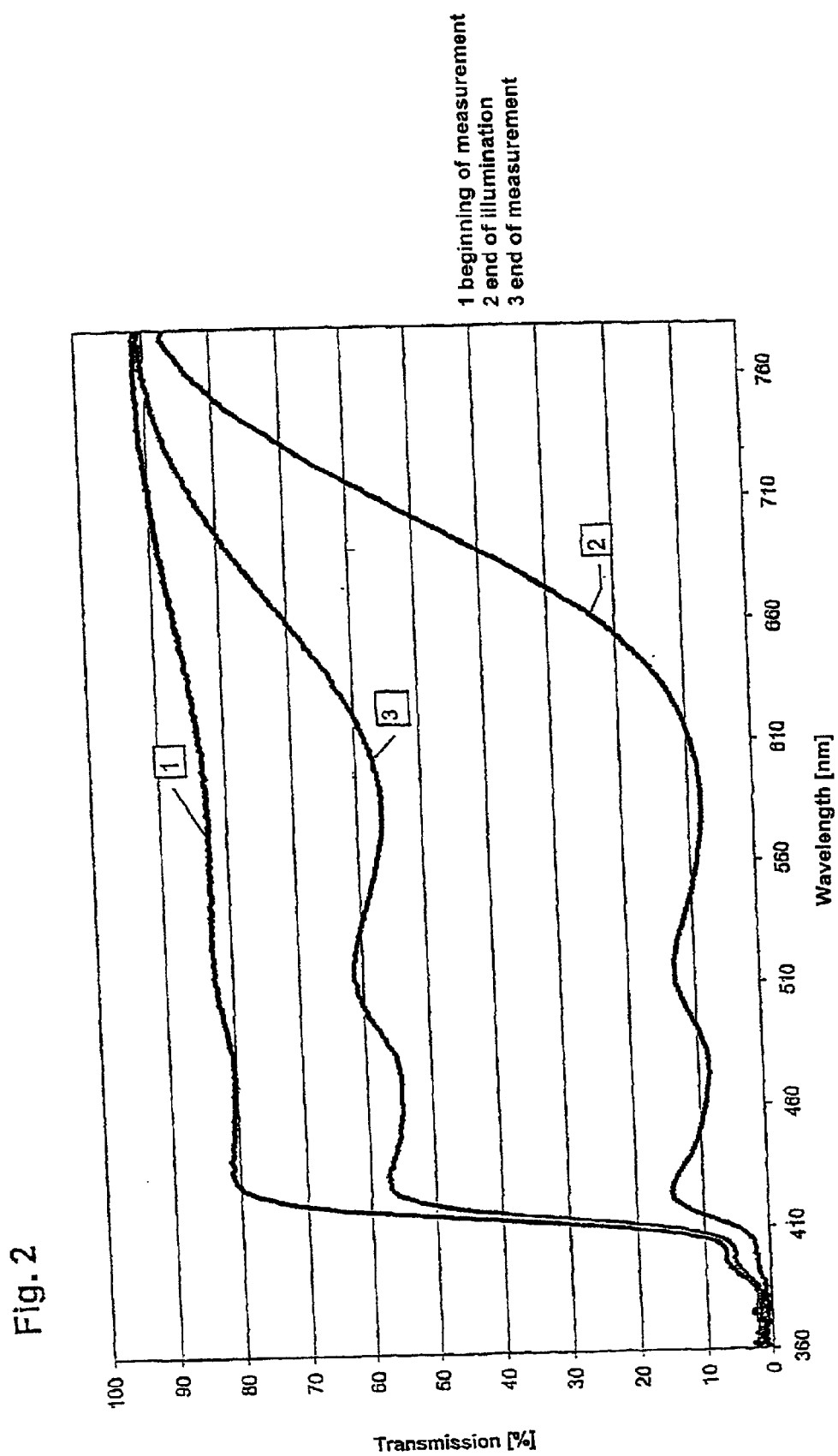
FIG. 2 shows the transmission curve for a commercially available photochromic or phototropic synthetic resin lens (Rodenstock ColorMatic Extra Grey) without the use of a contrast-increasing agent according to the invention. The transmission was recorded during illumination and lightening. The illumination time was 15 minutes, and irradiation was performed at 50 klux according to European Standard No. EN 1836, Section 6.1.3.1.1. Lightening took place in the dark.
Figure 3:
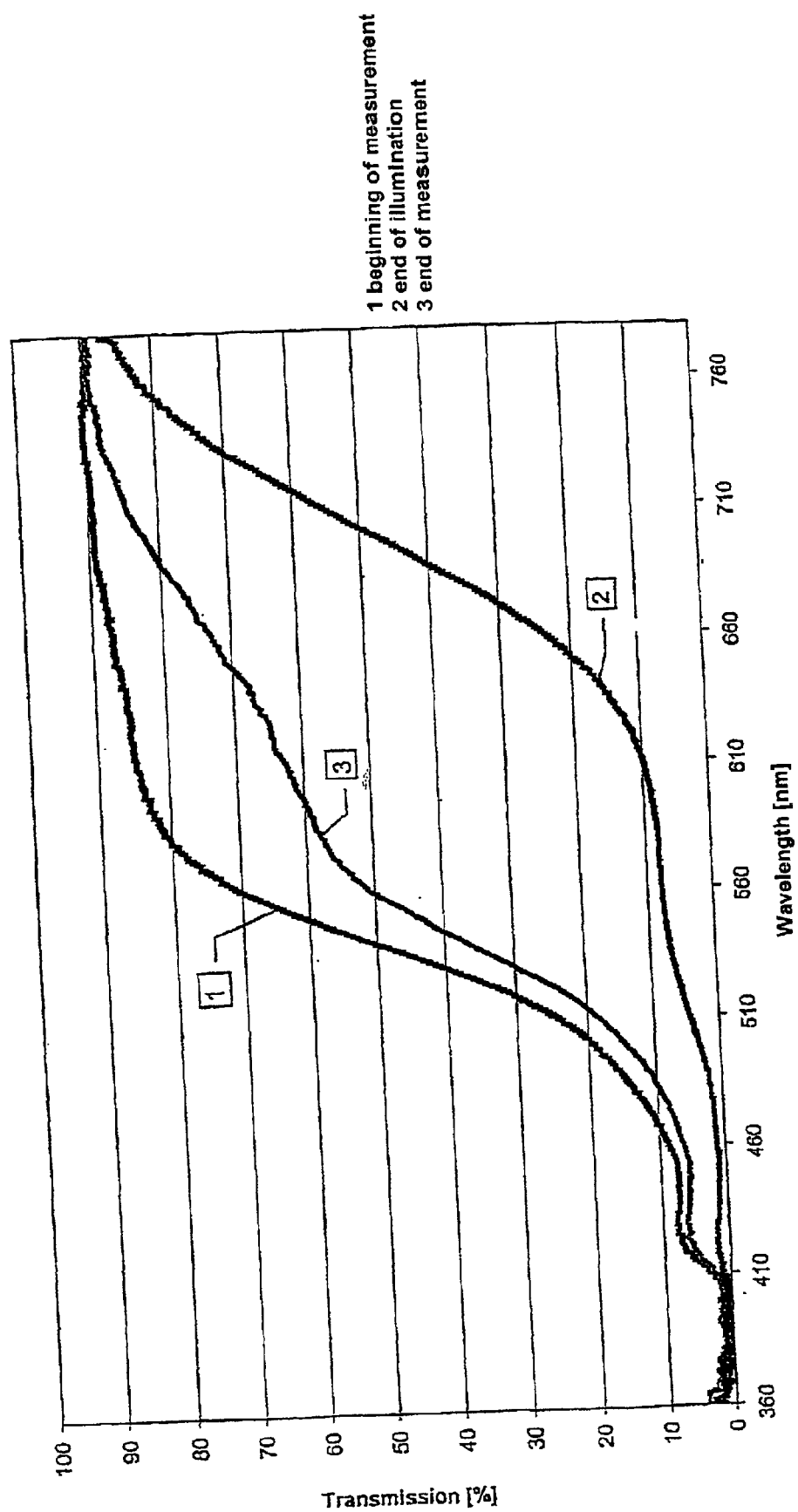
FIG. 3 shows the transmission curve for a photochromic synthetic resin object according to the invention, in the form of a phototropic lens produced according to the example described hereinafter. The transmission was recorded during illumination and lightening. The illumination time was 15 minutes, and irradiation was performed at 50 klux according to European Standard No. EN 1836, Section 6.1.3.1.1. Lightening took place in the dark.

FIG. 3 shows the transmission curve of the resulting phototropic lens, with the transmission recorded during illumination and lightening. The illumination time was 15 minutes, and irradiation was performed at 50 klux according to European Standard no. EN 1836, Section 6.1.3.1.1. Lightening took place in the dark. Compared to the transmission spectrum shown in FIG. 2 for a commercially available photochromic or phototropic synthetic resin lens (Rodenstock ColorMatic Extra Grey) without using a contrast-increasing agent according to the invention, the transmission spectrum represented in FIG. 3 shows a drastic reduction in the average transmission in the visible light region of 380 nm to 500 nm, which is caused by a corresponding absorption of the contrast-increasing agent in the form of Dorospers Orange R permanent dye in the visible light region of 380 nm to 500 nm. Consequently, the shortwave blue portion of the incoming light is substantially filtered out, resulting in a permanently increased contrast.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A photochromic synthetic resin object comprising:
   a transparent synthetic resin material and at least one photochromic dye incorporated therein,
   wherein said photochromic synthetic resin object further comprises at least one contrast-increasing agent which absorbs light in the visible wavelength range from 380 nm to 500 nm such that when the at least one photochromic dye is in a lightened state, the photochromic synthetic resin object exhibits a transmission of at least 5% and at most 30% at each wavelength in the visible wavelength range from 380 nm to 500 nm.

2. A photochromic synthetic resin object according to claim 1, wherein in the lightened state of at least one photochromic dye, the photochromic synthetic resin object has a transmission of at most 20% at each wavelength in the visible light region of 380 nm to 500 nm.

3. A photochromic synthetic resin object according to claim 2, wherein in the lightened state of at least one photochromic dye, the photochromic synthetic resin object has a transmission of at most 10% at each wavelength in the visible light region of 380 nm to 500 nm.

4. A photochromic synthetic resin object according to claim 1, wherein the contrast-increasing agent comprises a coloring agent selected from ments and organic dyes.

5. A photochromic synthetic resin object according to claim 1, wherein the contrast-increasing agent comprises a reflective or an absorbent coating.

6. A photochromic synthetic resin object according to claim 1, wherein the contrast-increasing agent comprises a coloring agent selected from the group consisting of pigments and organic dyes in combination with a reflective or absorbent coating.

* * * * *